United States Patent [19]
Sigg

[11] Patent Number: 5,373,163
[45] Date of Patent: Dec. 13, 1994

[54] APPARATUS AND METHOD FOR DETECTING GAMMA RADIATION

[75] Inventor: Raymond A. Sigg, Martinez, Ga.

[73] Assignee: The United States of America as represented by the United States Department of Energy, Wasington, D.C.

[21] Appl. No.: 66,235

[22] Filed: May 25, 1993

[51] Int. Cl.$^5$ .......................... G01T 1/16; G01T 7/00
[52] U.S. Cl. ........................ 250/370.01; 250/252.1
[58] Field of Search ................ 250/370.01, 252.1 R

[56] References Cited

U.S. PATENT DOCUMENTS

| | | | |
|---|---|---|---|
| 3,321,626 | 5/1967 | Allenden et al. | 250/370.03 |
| 4,056,726 | 11/1977 | Harchol | 250/370.01 |
| 4,090,074 | 5/1978 | Watt et al. | 378/88 |
| 4,237,470 | 12/1980 | Raudorf | 257/430 |
| 4,359,639 | 11/1982 | Wykes et al. | 250/359.1 |
| 4,566,114 | 1/1986 | Watt et al. | 378/88 |

FOREIGN PATENT DOCUMENTS

| | | | |
|---|---|---|---|
| 2014340 | 10/1971 | Germany | 250/370.01 |
| 66-92484 | 7/1981 | Japan | 250/252.1 R |

*Primary Examiner*—Constantine Hannaher
*Attorney, Agent, or Firm*—Brian R. Tumm; Harold M. Dixon; William R. Moser

[57] ABSTRACT

A high efficiency radiation detector for measuring X-ray and gamma radiation from small-volume, low-activity liquid samples with an overall uncertainty better than 0.7% (one sigma SD). The radiation detector includes a hyperpure germanium well detector, a collimator, and a reference source. The well detector monitors gamma radiation emitted by the reference source and a radioactive isotope or isotopes in a sample source. The radiation from the reference source is collimated to avoid attenuation of reference source gamma radiation by the sample. Signals from the well detector are processed and stored, and the stored data is analyzed to determine the radioactive isotope(s) content of the sample. Minor self-attenuation corrections are calculated from chemical composition data.

19 Claims, 2 Drawing Sheets

APPARATUS AND METHOD FOR DETECTING GAMMA RADIATION

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to ionizing radiation detectors. In particular, the present invention relates to germanium well detectors and methods for using such detectors with small, low-activity samples.

2. Discussion of Background

Nuclear material accountability is a concern in all nuclear materials production and handling processes, including the production of nuclear fuels, radiation sources, and radioactive tracers for medical imaging. Accountability can be improved by systematically tracking nuclear materials throughout the manufacturing process. Also, there is special concern about the possible loss or diversion of nuclear materials, notably materials useful in weapons production, during production or transport. Even trace quantities of materials deposited within processing equipment and pipelines can add up to significant losses over a period of time. This concern has led to a greater emphasis on nuclear materials accountability to provide assurance that the types and amounts of nuclear materials in a facility are known.

As an example of a particular process in which nuclear material accountability is used, the fabrication of uranium/aluminum fuel for some types of reactors involves melting and casting the uranium/aluminum alloy, followed by a series of machining, cutting, and extrusion steps. Scrap materials from the machining and cutting steps are melted down and blended with new materials in succeeding casting steps. A large fraction of the melt material in a typical process is recycled scrap. Variations in the uranium content of the starting material, variations in the amount of recycled scrap in the melt, and deposition of small amounts of material in the process equipment combine to introduce uncertainties in uranium accountability procedures. These uncertainties could be significantly reduced by measuring the uranium-235 ($^{235}U$) content of all production melts.

A number of techniques are available for analyzing the composition of materials by detecting ionizing radiation from the materials. For example, the composition of coal on a conveyor belt can be determined by detecting the transmission or scattering of X-rays or gamma rays therethrough (Watt, et al., U.S. Pat. No. 4,566,114). Other techniques for analyzing coal samples are based on detecting the transmission characteristics of beams of two different energies through the material (Watt, et al., U.S. Pat. No. 4,090,074; Wykes, et al., U.S. Pat. No. 4,359,639). The relative proportion of $^{235}U$ in a mixture of $^{235}U$ and $^{238}U$ can be found by monitoring the alpha activity of the mixture with a solid state detector (Allenden, et al., U.S. Pat. No. 3,321,626). These techniques are not readily adaptable to the problem of measuring the $^{235}U$ content of small or low-activity samples.

Semiconductor-based detectors are frequently used to detect ionizing radiation in the X-ray and gamma ranges. Such detectors typically have a P-I-N structure, that is, an intermediate zone of intrinsic or impurity-compensated semiconductor material (I) sandwiched between the p and n layers of a diode. When a reverse bias voltage is applied to the diode, the electric field across the diode sweeps charge carriers towards the p and n regions, creating the I region, or depletion zone.

The depletion zone is sensitive to low energy photons (X-rays and gamma rays). Photons interact with the material in the depletion zone primarily via the photoelectric effect, Compton scattering, and pair production. The photoelectric effect predominates at relatively low energies (up to about 100 keV); in most materials, Compton scattering is most important at energies above about 1 MeV. Pair production begins to predominate at energies of 5 to 10 MeV, depending on the composition of the absorber, but these energies are greater than the energies of decay gammas. Electrons and holes created by these mechanisms are swept by the electric field to the p and n regions. Each event produces a short (on the order of a $\mu$sec), electrical current pulse with an amplitude proportional to the energy deposited in the detector by the incoming photon. The current pulse is converted to a voltage pulse by an instrument such as a charge-sensitive preamplifier. A pulse height analyzer records the number of pulses or counting rate, the amplitude of each pulse, the energy distribution, and so forth. The efficiency and resolution of the detector depend on the counting geometry, or relative configurations of the source and detector, as well as the volume of the depletion zone and the bias voltage, both of which should be as large as possible. These factors, together with the energy of the incident radiation, all affect the number of detectable events that appear in the pulse-height spectrum.

Semiconductor detectors provide good energy resolution (about 1.5 keV) compared to other well-known types of radiation detectors such as ionization chambers, proportional counters, scintillation detectors, and so forth. The efficiency of detector materials depends on their atomic number (Z). Thus, silicon (Z=14) is suitable for use in the relatively low energy X-ray range, while germanium (Z=32) is used in higher energy X-ray and gamma-ray ranges.

Germanium detectors are preferred to other types of semiconductor detectors because they have a low concentration of net residual active impurities (less than $5 \times 10^{10}$ cm$^{-3}$) and small statistical variations in the electrical signals resulting from incident X-ray and gamma radiation. Also, they are highly stable and need not be stored at cryogenic temperatures. However, germanium has a relatively small band gap (0.74 eV), so germanium-based detectors have high thermal noise levels and correspondingly high leakage currents at room temperature. Therefore, they must be operated at cryogenic temperatures to minimize leakage current-induced noise.

A number of hyperpure germanium detectors are available. A coaxial detector comprises a cylinder of germanium with an n-type contact of diffused lithium and a p-type contact of implanted boron. One of these contacts is on the outer surface of the cylinder and the other on the surface of a narrow axial well. Raudorf (U.S. Pat. No. 4,237,470) and Harchol (U.S. Pat. No. 4,056,726) describe typical coaxial detectors. When a reverse bias is applied between the contacts, ionization caused by radiation incident on the outer surface permits electrical current to flow in pulses. The sample to be measured is positioned on or near the detector. Since radiation is emitted uniformly in all directions, only a small fraction of the radiation emitted by the sample reaches the detector.

Well detectors have a larger axial well than coaxial detectors. The counting geometry, that is, the configuration of the sample and detector vis-à-vis each other, is improved over that obtainable with a coaxial director by placing the sample directly into the well because more of the radiation emitted by the sample reaches the detector material. Well detectors are thus ideal for low-activity samples or cases where the sample size is small. Hyperpure germanium well detectors are available from several sources, including Canberra Nuclear Products Group, EG&G Ortec, and Princeton Gamma Technologies.

The data obtained with coaxial detectors and well detectors must be calibrated and corrected for sample self-attenuation. Self-attenuation effects are due to absorption of some of the gamma rays emitted by a sample by the sample material itself. Because these gammas never exit the sample and never reach the detector, they do not contribute to the counting rate. The magnitude of this effect depends on the composition of the sample, the volume and depth of the sample, and so forth. Additional data obtained with a transmission source—a radiation source having a stable, uniform output in the energy range of interest—can be used to correct for self-attenuation effects. A shuttered transmission source is positioned so that the sample is between the transmission source and the detector. The counting rate is measured with the shutter open (sample and transmission source) and closed (sample only). These data are used to determine a correction factor for the sample self-attenuation. A suitable transmission source for measuring the $^{235}$U content of a sample is $^{169}$Yb, which has two peaks, at 177.2 keV and 197.9 keV, bracketing the $^{235}$U peak at 185.7 keV. However, $^{169}$Yb has a relatively short half-life (32 days), so $^{169}$Yb sources must be frequently replaced or reactivated.

A reference source adds a known, stable output to the recorded data. For example, to determine the $^{235}$U content of a sample, the reference source preferably has an energy peak near the $^{235}$U peak at 185.7 keV. Data from the known source are used in computing the $^{235}$U content of the sample from the 185.7 keV peak data. When the sample is between the reference and the detector, some of the reference photons are absorbed by the sample, leading to uncertainties in the counting rate. Ytterbium-169 is a suitable reference source for $^{235}$U measurements, since its two peaks provide a good correction factor for these uncertainties. However, as noted above, $^{169}$Yb sources are short-lived and therefore expensive to use.

Both coaxial detectors and well detectors can be used to determine the $^{235}$U content of uranium/aluminum samples. However, when coaxial detectors are used, the best results are obtained with relatively large samples. Smaller samples minimize personnel exposure to radiation, but have intrinsically lower counting rates and require longer measurement times. In addition, self-attenuation corrections must be determined for each sample due to unavoidable variations in the composition of successive production melts. There is a need for a method and apparatus for making fast, accurate measurements of the radioactive isotopic content of small, low-gamma-activity samples.

SUMMARY OF THE INVENTION

According to its major aspects and broadly stated, the present invention is a highly efficient radiation detector for measuring the amount of a gamma-emitting radioisotope or radioisotopes in small, low-activity samples. The detector includes a semiconductor well detector, a spaced-apart casing, a collimator with two spaced-apart channels formed therein, and a reference source. The sample is placed in a cavity formed by the combination of the well and the first channel of the collimator; the reference source is placed in the second channel of the collimator. Gamma radiation from the two sources, the sample and the reference source, is thereby collimated, largely eliminating interference effects. The well detector monitors gamma radiation emitted by the reference source and samples such as, but not limited to, $^{235}$U in a liquid sample. The well detector sends an output signal to a signal storage and processing apparatus, and the stored data is analyzed to determine the radioisotope(s) content of the sample. Minor self-attenuation corrections are calculated from chemical composition data; the calculation eliminates the need for short-lived transmission sources and provides highly accurate results. For example, the $^{235}$U content of a sample can be determined with an overall uncertainty better than 0.7% (one sigma SD).

To measure the radioisotope(s) content of a sample, a liquid sample is prepared by dissolving a known mass of the solid in a known quantity of acid. A suitable reference source is placed in the second channel of the collimator, and the collimator is placed adjacent to the well detector such that the combination of the first channel and the well forms a cavity. The liquid sample is placed in a sample holder, capped, and positioned in the cavity. The radiation detector is maintained at a low temperature, typically the temperature of liquid nitrogen, for the measurement. A high (several thousand volts) reverse bias voltage is applied across the p and n contacts of the well detector. Alternatively, the detector is supplied with an integral cryostat, and continuously maintained at high reverse bias and liquid nitrogen temperature. Signals from the well detector are processed and stored, then analyzed by means well known in the art to determine the radioisotope content of the sample.

According to an alternative embodiment of the present invention, a semiconductor well detector is enclosed by a spaced-apart casing or liner. The sample holder is placed in the well. A shuttered transmission source is positioned above the sample holder and a reference source abuts the well detector. The well detector monitors gamma radiation emitted by the reference source, the sample, and the transmission source (with the shutter in closed and open positions). The reference and transmission source data am used to correct the sample data and counting rate losses (due to pulse pile up, etc.) and correct for sample self-attenuation effects.

A radiation detector according to the present invention can be used to determine the $^{235}$U content of uranium/aluminum alloy samples having a volume as small as 6–7 mL, with a uranium content as low as 3–12 g/L. The counting efficiency of the detector is higher by a factor of 5 over the counting efficiency of a typical commercially-available coaxial detector. In addition, the counting geometry of the detector minimizes uncertainties due to small variations in sample geometry. With the appropriate choice of reference source for the energy band of interest, a radiation detector according to the present invention can be used to determine the sample content of other radioactive isotopes.

An important feature of the present invention is the well detector. The well detector is a well-known type having a well formed in one end surface. An n-type contact is formed on the outer surface of the well detector, and a p-type contact is formed on the surface of the well. The well detector is preferably made of a semiconducting material having stable electrical characteristics at room temperature, including but not limited to hyperpure germanium.

An additional feature of the present invention is the collimator, positioned near the end surface of the well detector. The collimator has two spaced-apart channels formed therein. The first channel extends through the collimator. When the collimator is near the end surface of the well detector, a cavity is formed by the combination of the first channel and the well and adapted to contain the sample holder. The second channel has a closed end, and an open end adjacent to the end surface of the well detector. The second channel is adapted to hold the reference source. These two channels have axes that do not intersect in the collimator or the detector, axes that are preferably parallel. The collimator absorbs a substantial portion of the low-energy ionizing radiation (photons with energies less than approximately 60 keV) impinging thereon. The sample and the reference source emit radiation in all directions, but only photons traveling approximately parallel to the axes of the two channels reach the well detector. Thus, radiation from the reference does not reach the sample, largely eliminating interaction between the sample and the reference source without a significant decrease in the number of photons reaching the well detector. The collimator is made of a material that is an efficient shield for low energy X-rays and gamma radiation, such as a material selected from the group consisting essentially of the Group VIIIA elements, and alloys and mixtures thereof. However, other materials such as tungsten, lead, and so forth can be used if desired. Preferably, the collimator is made of stainless steel for corrosion resistance.

A further feature of the present invention is the casing. The casing prevents thermal contact between the sample and the well detector and protects the well detector from contamination by moisture and other substances in the operating environment. It protects the well detector from possible contamination by the sample, such as might be caused by accidental spills or breakage of the sample holder. The casing is made of a stable, nonporous material that transmits a substantial part of the radiation in the energy range of interest. By way of example, when the radiation detector is used to measure the $^{235}U$ activity of a sample, the casing may be stainless steel with a thickness greater than approximately 3 mil ($8 \times 10^{-3}$ cm), and preferably in the range of 3-7 mil (approximately $8 \times 10^{-3}$ cm-$18 \times 10^{-3}$ cm). For samples containing other radioactive isotopes, the casing is any convenient stable, nonporous material that is substantially transparent to X-ray or gamma radiation in the energy range of interest.

Still another feature of the present invention is the reference source. The collimator largely prevents interference between the sample and the reference source, so that the reference source adds a known, stable output to the recorded data. The reference source is any suitable radioactive source with a stable, uniform output of X-ray or gamma radiation in or near the energy range of interest.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

A high efficiency radiation detector has been developed for measuring ionizing radiation from small-volume, low-activity liquid samples to determine the sample content of a radioactive isotope or isotopes of interest. The radiation detector includes a semiconductor well detector, a casing, a collimator with two spaced-apart channels formed therein, and a reference source. By collimating, it is meant that radiation, which is emitted in all directions, is mostly absorbed by the collimator except for a portion of the radiation traveling nearly parallel to the axis or long dimension of the collimator. The emitted radiation is collimated when each particle of radiation travels an essentially parallel path on emergence from the collimator.

The sample is placed in a cavity formed by the combination of the well and the first channel of the collimator; the reference source is placed in the second channel of the collimator. Gamma radiation from the reference source is thereby collimated, largely eliminating attenuation effects due to reference gamma radiation passing through the sample. The well detector monitors gamma radiation emitted by the reference source and the sample, sending an output signal to signal storage and processing apparatus. The stored data is analyzed to determine the radioactive isotope content of the sample. The radiation detector eliminates the need for short-lived transmission sources and provides highly accurate results. By way of example, for samples prepared from alloy grab samples collected during the manufacture of uranium/aluminum fuel, the radiation detector provides $^{235}U$ values with an overall uncertainty better than 0.7% (one sigma SD).

Figure 1:
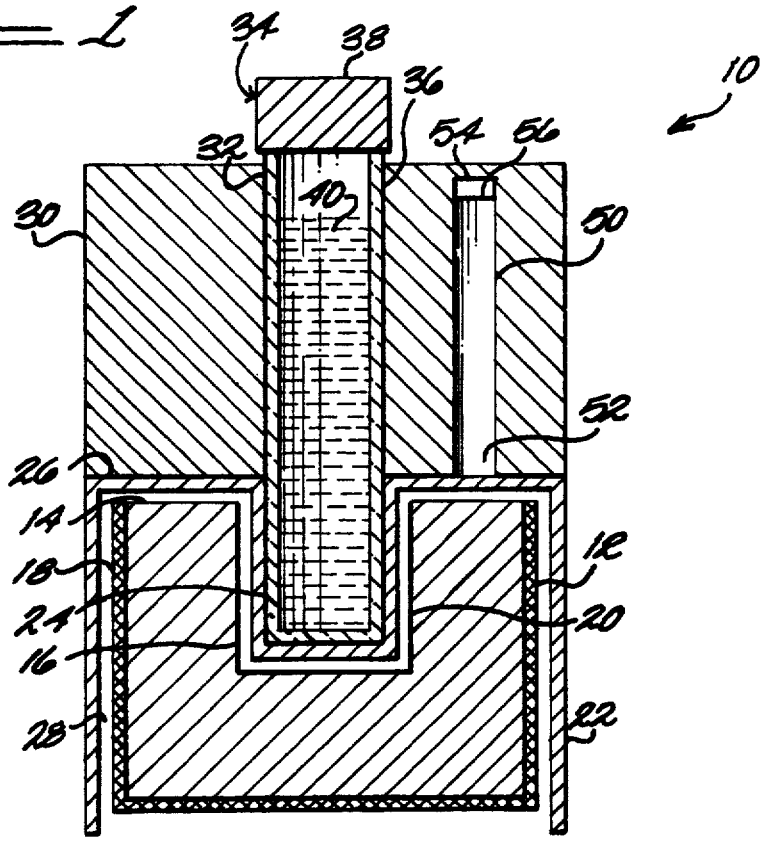
FIG. 1 is a cross-sectional, schematic view of a radiation detector according to a preferred embodiment of the present invention.

Referring now to FIG. 1, there is shown a cross-sectional, schematic view of a radiation detector according to a preferred embodiment of the present invention. Radiation detector 10 includes well detector 12 with end surface 14. Well 16 is formed in end surface 14, preferably such that the longitudinal axis of well 16 is substantially perpendicular to end surface 14. N-type contact 18 is formed on the outer surface of well detector 12, and p-type contact 20 is formed on the surface of well 16. Casing 22 surrounds well detector 12, enclosing well detector 12 and conforming to the contours of well detector 12 and well 16. Casing 22 has generally the same shape as well detector 12, with well 24 formed in end surface 26. Casing 22 is separated from well detector 12 by gap 28.

Collimator 30 is adjacent to casing 22, so that at least a portion of collimator 30 abuts end surface 26. Collimator 30 has two spaced-apart channels formed therein. First channel 32 is in fluid communication with well 16 of well detector 12 and well 24 of casing 22. Channel 32 is preferably coaxial with wells 16 and 24, and extends through collimator 30, as shown in FIG. 1. First channel 32 and well 24 are preferably approximately cylindrical with approximately equal radii. Channel 32 holds sample holder 34. Sample holder 34 has wall 36 and cap 38, and contains sample 40.

Second channel 50 has open end 52 and closed end 54. Open end 52 is adjacent to end surface 26 of casing 22. Channel 50 is adapted to hold reference sample 56. If desired, channel 50 may extend through collimator 30, with reference sample 56 supported therein by any convenient means. First channel 32 and second channel 50 are preferably substantially parallel, as shown in FIG. 1. However, as long as channels 32 and 50 are spaced apart so that their axes do not intersect in detector 12, they may be at any angle with respect to one another.

Well detector 12 and collimator 30 may be approximately cylindrical in shape, or assume any other suitable geometry without departing from the spirit of the present invention. Well detector 12 is preferably a semiconducting material that can tolerate high reverse bias voltages and has stable electrical characteristics at room temperature, including but not limited to hyperpure germanium with less than one impurity atom per $10^{+12}$ germanium atoms. As noted above, stability at room temperature is a desirable characteristic for ease in storage and transport, even for a detector operated at cryogenic temperatures. Furthermore, hyperpure germanium crystals provide good resolution (approximately 1.5 keV) with small statistical variations in the electrical signals therefrom resulting from incident X-ray and gamma radiation. Alternatively, well detector 12 is made of any suitable material having similar interaction properties with X-ray and gamma radiation, stability at room temperature, and good resolution.

Contacts 18 and 20 may take any appropriate forms. Thus, n-type contact 18 may be a diffused contact such as the well known type formed by diffusing lithium into hyperpure germanium. P-type contact 20 is preferably a "thin" contact having a thickness of one micron or less, such as may be formed by implanting boron into hyperpure germanium. When sample holder 34 containing sample 40 is in well 24, contact 20 therefore absorbs a minimum of incident radiation from sample 40 before that radiation penetrates into the volume of well detector 12.

Well 16 has a diameter in the range of approximately 10–20 mm and a depth up to approximately 5 cm. The smaller the diameter of well 16, the better the overall performance of detector 10 since contacts 18 and 20 are farther apart. The farther apart the contacts, the lower the capacitance and the higher the signal-to-noise ratio of detector 10. However, the larger well 16, the larger the sample 40 that may be contained therein. Larger samples emit more radiation and require shorter counting times, but also result in greater personnel exposure to radiation and greater uncertainties in the application of the sample results to the production melt. Therefore, the optimum sizes of well 16 and sample 40 are best determined on a case-by-case basis for each application.

Well detector 12 may be a commercially-available hyperpure germanium well detector, including but not limited to those available from Canberra Nuclear Products Group, EG&G Ortec, and Princeton Gamma Technologies. Alternatively, well detector 12 may be manufactured in any convenient size and configuration for the particular application.

Casing 22 surrounds well detector 12, enclosing well detector 12 and well 16. Casing 22 acts as a liner, protecting well detector 12 from possible contamination by sample 40 such as may be caused by accidental spills or breakage of sample holder 34. Casing 22 also protects well detector 12 from contamination by moisture and other substances in the operating environment. Gap 28 and casing 22 act as a thermal barrier and to prevent direct contact between sample holder 34 and well detector 12, so that well detector 12 may be maintained at low operating temperatures while the sample to be measured is at approximately room temperature.

Casing 22 is made of a stable, nonporous material that transmits at least some, and preferably a substantial part of the incident X-ray or gamma radiation in the energy range of interest. For example, when detector 10 is used to measure the $^{235}U$ content of a sample, casing 22 may be made of stainless steel having a thickness at least approximately 3 mil ($8 \times 10^{-3}$ cm) and preferably in the range of 3–7 mil (approximately $8 \times 10^{-3}$ cm–$18 \times 10^{-3}$ cm). When detector 12 is used to measure the sample content of other radioactive isotopes, casing 22 is made of any suitable material that transmits radiation from those isotopes.

Collimator 30 absorbs all or most of the low-energy (less than approximately 60 keV) radiation impinging thereon. Reference source 56 emit radiation in all directions, but only photons traveling in directions approximately parallel to channel 50 reach detector 12. Photons traveling in other directions are largely absorbed by collimator 30. As noted above, if radiation from reference source 56 was not collimated, then sample 40 could absorb photons emitted by reference source 56, leading to a reduction in charge carrier production and concomitant uncertainties in the recorded data. If allowed, this interaction between sample 40 and reference source 56 would decrease the certainty of the reference count rate correction. By placing sample 40 and reference source 56 in collimator 30, this interaction is largely eliminated without a significant decrease in the number of sample photons reaching well detector 12. It will be understood that channels 32 and 50 need not be approximately parallel as shown in FIG. 1: as long as channels 32 and 50 are spaced apart and do not intersect, interaction between sample 40 and photons from reference source 56 is largely precluded. However, channels 32 and 50 must be positioned within collimator 30 in a manner that allows radiation from sample 40 and collimated radiation from reference source 56 to reach well detector 12.

Collimator 30 is made of a material that absorbs low-energy (less than approximately 60 keV) photons, such as a material selected from the group consisting essentially of the Group VIIIA elements, together with alloys and mixtures thereof. However, other materials such as tungsten, lead, and so forth may be used. Collimator 30 is preferably made of a corrosion-resistant material such as stainless steel. If desired, collimator 30 is attached to well detector 12 by any convenient means.

Sample holder 34 is made of any convenient materials that are nonreactive with the operating environment and sample 40. For example, sample holder 34 may be glass, with a plastic or metal cap 38. Sample holder 34 may be approximately cylindrical in shape, as are well 16 and channels 32, 50. The dimensions of sample holder 34 are such that sample holder 34 may be contained within the cavity formed by the combination of first channel 32 and wells 16, 24.

Reference source 56 is any radioactive source with a stable, uniform output of gamma radiation in the energy range of interest. Reference source 56 adds a known, stable output to the recorded data from well detector 12, so that corrections necessary to offset the effects of pulse pile-up and dead-time can be readily determined. If any part of sample 40 is located between reference source 56 and well detector 12, there is some loss of signals from reference source 56 due to attenuation by sample 40. As will be evident, such attenuation occurs if reference source 56 is inside well 16. In order that the variations in counting rate due to reference source 56 depend only on pile-up and dead-time losses, photons emitted by reference source 56 are collimated by collimator 30 so that they do not pass through sample 40 before reaching well detector 12.

By way of example, radiation detector 10 is used to measure the $^{235}U$ concentration of a uranium/aluminum melt. A grab sample is taken from any desired stage in the manufacturing process, such as from a cast uranium-/aluminum ingot prior to machining. A liquid sample (sample 40) is prepared by dissolving a known mass of the alloy in a known quantity of acid. Suitable acids include nitric acid. sulfuric acid, and so forth. Preferably, sample 40 is no larger than necessary for the analysis.

Reference source 56 is placed in second channel 50 of collimator 30. Reference source 56 preferably has a long half-life and an energy peak in or near the energy range of interest, such as $^{241}Am$ with a peak at 59.5 keV and a half-life of 433 years. Because of its long half-life, reference source 56 may be mounted in second channel 50 and left therein throughout a series of measurements. Collimator 30 is placed on casing 22 and first channel 32 is aligned with wells 16 and 24.

Liquid sample 40 is introduced into sample holder 34, which is covered with cap 38 and positioned in the cavity formed by the combination of first channel 32 and wells 16, 24. Sample 40 is small. preferably on the order of 10 mL or less in volume, so small variations in pipetting can easily affect the fill level of sample holder 34. Such variations also lead to uncertainties in the counting efficiency due to small changes in geometry. When the depth of sample 40 is sufficiently large, small uncertainties in sample depth have little effect on the number of photons reaching well detector 12. Therefore, the liquid level preferably extends above end surface 14 to an appropriate level within collimator 30 as shown in FIG. 1, to minimize the effects of geometry on counting efficiency. This minimizes the sensitivity of the measurement to small differences in the fill level of sample holder 34.

When sample 40 is very small, all or most of the photons emitted by sample 40 exit therefrom. As the depth and volume of sample 40 increase, more and more of the photons are absorbed by sample 40 before reaching well detector 12, leading to uncertainties in the recorded data. Self-attenuation corrections can be calculated from chemical composition data (determined elsewhere), rather than in separate measurements using a transmission source.

As noted above, germanium detectors are cooled during use to minimize their thermal noise or leakage current. Therefore, well detector 10 is used with a cryostat. Cryostat assembly 180 includes liquid nitrogen Dewar 182 with fill collar 184 and fill and vent tubes 186, 188. Conduit 190 is in fluid communication with Dewar 182. Casing 22 is attached to flange 192. Casing 22 encloses well detector 12 and control circuitry for operating the detector. Cryopumping by molecular sieves maintains the vacuum inside casing 22. Detector 12 is cooled to approximately 77 K. ($\approx -196°$ C.). The reverse leakage current across well detector 12 can thereby be reduced to less than $10^{-9}$ amperes. If desired, well detector 12 is continuously maintained at liquid nitrogen temperatures and high reverse bias.

After detector 10 has cooled, a high (several thousand volts) reverse bias voltage is applied across contacts 18 and 20 of well detector 12. Some of the photons emitted by the two sources of radiation, sample 40 and reference source 56, reach well detector 12. where they interact with the material of well detector 12 to produce current pulses. Commercially-available, spectroscopy-grade nuclear electronics instrumentation is used to process and store the signals from well detector 12. A charge-sensitive preamplifier converts the current pulses from well detector 12 to voltage pulses, and a pulse height analyzer records the number of pulses, the amplitude of each pulse, the energy distribution, and so forth. A digital stabilizer prevents gain and offset shifts in the recorded data by using pulses from two peaks that are always present, the $^{241}Am$ peak at 59.5 keV and the $^{235}U$ peak at 185.7 keV. Data are collected for approximately 30 minutes.

Figure 2:
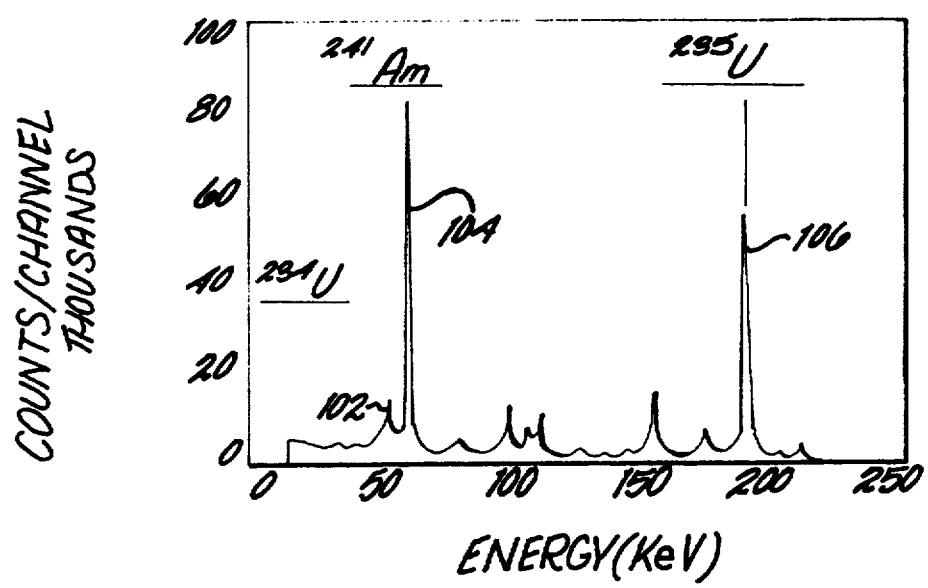
FIG. 2 is a typical gamma-ray spectrum obtained with a radiation detector according to a preferred embodiment of the present invention.

A spectrum from a typical sample is illustrated in FIG. 2, showing the number of counts per channel vs. the energy in keV. Spectrum 100 includes peaks 102 ($^{234}U$, approximately 50 keV), 104 ($^{241}Am$, 59.5 keV), 106 ($^{235}U$, 185.7 keV). Spectrum 100 also includes some background noise, as well as other peaks due to thorium X-rays produced by the decay of uranium, and uranium X-rays from self-fluorescence of sample 40. The overall counting rate across the calibrated range of detector 10 is low, in the range of approximately 1700 to 2900 counts/sec for each integrated spectrum.

The areas of the 59.5 keV and 185.7 keV peaks above the background continuum are computed, and a series of corrections are applied to the area of the 185.7 keV peak to determine the $^{235}U$ content of the sample. These corrections include corrections for the measurement live-time and sample self-attenuation, and fixed corrections for the efficiency of well detector 12 and for the gamma-ray emission probabilities and half-lives of sample 40 and reference source 56. The methodology for the fixed corrections is well known in the art, being common to many gamma-ray spectrometry applications.

Samples with volumes as small as 6–7 mL, containing in the range of 3–12 g/L uranium, can be analyzed with radiation detector 10. The $^{235}U$ values thus obtained have an overall uncertainty better than 0.7% (one sigma SD). In comparison, samples about 5 times greater, on the order of 25–30 mL, are needed for a conventional coaxial detector. The counting efficiency of detector 10 is therefore increased by a factor of 5 over the counting efficiency of a commercially-available well detector. Sufficient data can be collected in counting times as little as 30 minutes, even for these small samples. In addition, the counting geometry of detector 10 minimizes uncertainties due to small variations in sample geometry.

Figure 3:
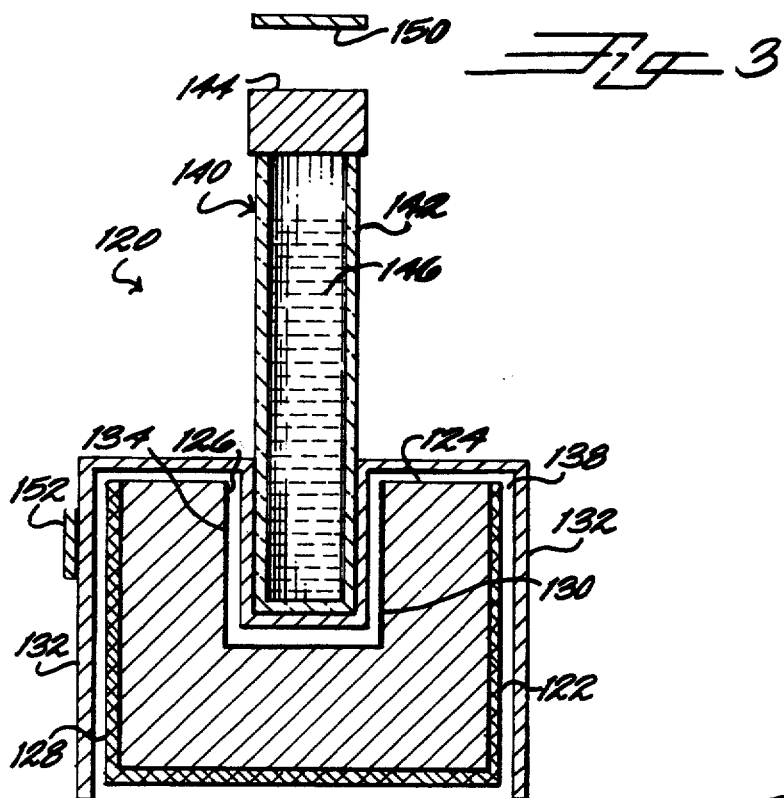
FIG. 3 is a cross-sectional, schematic view of a radiation detector according to an alternative embodiment of the present invention.
Figure 4:
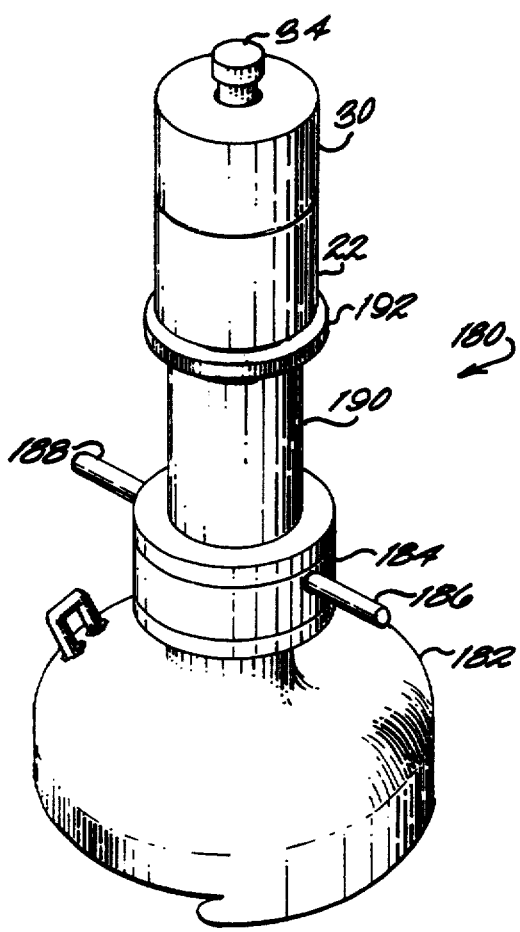
FIG. 4 is a perspective view of the radiation detector of FIG. 1 in use.

An alternative embodiment of the present invention is shown in FIG. 3. Radiation detector 120 includes well detector 122 with end surface 124. End surface 124 has well 126 formed therein. Preferably, the longitudinal axis of well 126 is approximately perpendicular to end surface 124. The outer surface of well detector 122 has an n-type contact 128; the surface of well 126 has a p-type contact 130. Casing 132 surrounds well detector 122, enclosing well detector 122 and following the contours of well detector 122 and well 126. Casing 132 has well 134 formed in end surface 136. Gap 138 separates casing 132 from well detector 122.

Wells 126, 134 hold sample holder 140, having wall 142 and cap 144. Sample holder 140 contains fluid sample 146. Shuttered transmission source 150 is positioned above sample holder 140, preferably spaced apart therefrom. Reference source 152 abuts casing 132, as indicated in FIG. 3.

Transmission source 150 is of a type well known in the art, adapted to the energy distribution of the particular radioactive isotope or isotopes expected to be found in sample 146. Thus, if sample 146 contains $^{235}U$, a suitable source is $^{169}Yb$: its two peaks, at 177.2 keV and 197.9 keV, bracket the $^{235}U$ peak at 185.7 keV. However, $^{169}Yb$ has a relatively short half-life (32 days), so $^{169}Yb$ sources require frequent replacement and/or reactivation.

Data obtained from transmission source 150 are used to correct for sample self-attenuation. As noted above, some of the photons emitted by sample 146 are absorbed by the sample before reaching well detector 122. This effect varies with variations in the composition of successive samples 146 and uncertainties in the fill level of sample holder 140. The additional data obtained from transmission source 150 are used to correct for these variations in sample self-attenuation. For small sample volumes and relatively low concentrations of radioactive isotopes, the needed corrections are small (a few %). In fact, for detector 10 shown in FIG. 1 and described above, the corrections can be accurately calculated without reliance on a transmission source. Otherwise, detector 120 is used in a similar fashion to detector 10.

With the appropriate choice of reference source, radiation detectors 10 and 120 can be used to monitor X-ray or gamma radiation from samples containing radioactive isotopes. Detectors 10 and. 120 are especially suited to analyzing small-volume, low activity samples, including mixed wastes and environmental samples. Accountability is improved because sample volume and analysis time are reduced over those needed for conventional detectors. The problem of waste disposal is also mitigated since only small-volume samples are needed.

It will be apparent to those skilled in the art that many changes and substitutions can be made to the preferred embodiment herein described without departing from the spirit and scope of the present invention as defined by the appended claims.

What is claimed is:

1. An apparatus for measuring ionizing radiation, said apparatus for use with a sample source of radiation and a reference source of radiation, said apparatus comprising:

a well detector for detecting said ionizing radiation, said detector having a well, said well detector emitting a signal when exposed to said radiation, said signal related to the amount and energy of said radiation to which said well detector is exposed; and means for collimating radiation from said reference source, said collimating means positioned in spaced relation to said well detector so that said collimating means can direct said collimated radiation from said reference source into said well detector so that said radiation from said reference source does not pass through said sample source when said sample source is positioned so that at least a portion thereof is in said well, said radiation from said sample source and said collimated radiation from said reference source entering said well detector and producing an output related to the amounts of said radiation.

2. The apparatus as recited in claim 1, wherein said well detector is made of germanium.

3. The apparatus as recited in claim 1, wherein said well detector further comprises a semiconductor crystal.

4. The apparatus as recited in claim 1, wherein said well has an interior wall, and said apparatus further comprises a liner spaced apart from said wall.

5. The apparatus as recited in claim 1, wherein said collimating means is aligned with said well so that said well and said collimating means are in fluid communication.

6. The apparatus as recited in claim 1, further comprising a casing enclosing said well detector wherein said casing is at least approximately $8 \times 10^{-3}$ cm thick.

7. An apparatus for measuring ionizing radiation, said apparatus for use with a sample source of radiation and a reference source of ionizing radiation, said apparatus comprising:

means for detecting said ionizing radiation, said detecting means emitting a signal when exposed to said radiation, said signal related to the amount and energy of said radiation to which said detecting means is exposed, said detecting means having an end surface and a well formed in said end surface;

a collimator, said collimator adjacent to said end surface, said collimator having a first channel having a first axis, and a second channel spaced apart from said first channel and having a second axis, said first and said second axes passing through said detecting means, said first axis aligned so as not to intersect said second axis within said collimator or said detecting means, said apparatus measuring radiation when said sample source is placed through said first channel and said reference source is placed in said second channel, said radiation from said sample and said reference source being collimated as it emerges from said first and said second channels and enters said detecting means whereby said collimated radiation causes said detecting means to emit an electrical signal related to the amount of said collimated radiation.

8. The apparatus as recited in claim 7, wherein said well is in fluid communication with said first channel.

9. The apparatus as recited in claim 7, wherein said well is coaxial with said first channel.

10. The apparatus as recited in claim 7, wherein said detecting means includes a germanium well detector.

11. The apparatus as recited in claim 7, wherein said collimator is made from a material selected from the group consisting essentially of the Group VIIIA elements, lead, tungsten, and alloys and mixtures thereof.

12. The apparatus as recited in claim 7, wherein said collimator is made of stainless steel and said detecting means includes a germanium well detector.

13. The radiation detector as recited in claim 7, wherein said well detector has an operating temperature, further comprising means in thermal communication with said well detector for maintaining said well detector at said operating temperature.

14. An apparatus for measuring ionizing radiation, said apparatus for use with a sample source of ionizing radiation and a reference source, said apparatus comprising:
- a semiconductor well detector, said detector having an end surface with a well formed therein; and
- a collimator adjacent to said end surface, said collimator having
  - a first channel having a first axis, said first channel being coaxial with said well, and
  - a second channel spaced apart from said first channel and having a second axis,
- said second channel aligned with respect to said end surface so that, when said reference source is positioned in said second channel, collimated radiation from said reference source enters said end surface,
- said second channel aligned with respect to said first channel so that, when said sample source is placed through said first channel so that at least a portion of said sample source is in said well and another portion of said sample source is in said first channel, radiation from said reference source does not intersect said sample source,
- radiation from said sample source and said reference source entering said well detector whereby said radiation causes said well detector to emit an electrical signal related to the amount of said radiation.

15. The apparatus as recited in claim 14, further comprising a casing enclosing said well detector.

16. The apparatus as recited in claim 14, further comprising a stainless steel casing enclosing said well detector.

17. The apparatus as recited in claim 14, wherein said well detector includes a germanium crystal.

18. The apparatus as recited in claim 14, wherein said collimator is made from a material selected from the group consisting of the Group VIIIA elements, lead, tungsten, and alloys and mixtures thereof.

19. The apparatus as recited in claim 14, wherein said well detector has an operating temperature, further comprising means in thermal communication with said well detector for maintaining said well detector at said operating temperature.

* * * * *